(12) United States Patent
Konishi et al.

(10) Patent No.: US 11,738,261 B2
(45) Date of Patent: Aug. 29, 2023

(54) VIBRATION CONTROL APPARATUS

(71) Applicant: Sony Interactive Entertainment Inc., Tokyo (JP)

(72) Inventors: Yukari Konishi, Tokyo (JP); Yusuke Nakagawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/627,602

(22) PCT Filed: Aug. 24, 2017

(86) PCT No.: PCT/JP2017/030344
§ 371 (c)(1),
(2) Date: Dec. 30, 2019

(87) PCT Pub. No.: WO2019/038887
PCT Pub. Date: Feb. 28, 2019

(65) Prior Publication Data
US 2020/0122028 A1 Apr. 23, 2020

(51) Int. Cl.
*A63F 13/285* (2014.01)
*G06F 3/01* (2006.01)
(52) U.S. Cl.
CPC ............ *A63F 13/285* (2014.09); *G06F 3/016* (2013.01); *A63F 2300/1037* (2013.01)
(58) Field of Classification Search
CPC ............ A63F 13/285; A63F 2300/1037; A63F 13/79; G06F 3/016
USPC .......................................................... 463/30
See application file for complete search history.

(56) References Cited

U.S. PATENT DOCUMENTS

| | | | |
|---|---|---|---|
| 5,889,670 A | * | 3/1999 | Schuler ............... G05B 19/108 700/83 |
| 6,766,299 B1 | | 7/2004 | Bellomo |
| 6,864,877 B2 | | 3/2005 | Braun |
| 7,010,488 B2 | | 3/2006 | van Santen |
| 7,218,310 B2 | | 5/2007 | Goldenberg |
| 8,248,218 B2 | | 8/2012 | Yamaya |
| 8,249,276 B2 | | 8/2012 | Hamada |

(Continued)

FOREIGN PATENT DOCUMENTS

| | | |
|---|---|---|
| CN | 1397061 A | 2/2003 |
| CN | 102576252 A | 7/2012 |

(Continued)

OTHER PUBLICATIONS

Notice of Reasons for Refusal for corresponding JP Application No. 2019513214, 12 pages, dated Apr. 28, 2020.

(Continued)

*Primary Examiner* — Peter S Vasat
*Assistant Examiner* — Stephen Alvesteffer
(74) *Attorney, Agent, or Firm* — Matthew B. Dernier, Esq.

(57) ABSTRACT

Provided is a vibration control apparatus that acquires pseudo force sensory vibration data descriptive of a pseudo force sensory vibration causing a user to feel a pseudo force sensation, acquires tactile sensory vibration data descriptive of a tactile sensory vibration causing the user to feel a tactile sensation, and causes a vibration mechanism to generate a vibration based on the pseudo force sensory vibration data and the tactile sensory vibration data.

10 Claims, 10 Drawing Sheets

(56) References Cited

U.S. PATENT DOCUMENTS

| | | | |
|---|---|---|---|
| 8,325,144 B1 | 12/2012 | Tierling | |
| 8,378,797 B2 | 2/2013 | Pance | |
| 8,384,316 B2* | 2/2013 | Houston | G06F 3/016 318/128 |
| 8,479,274 B2 | 7/2013 | Furukawa | |
| 8,487,759 B2 | 7/2013 | Hill | |
| 8,727,878 B2 | 5/2014 | Longdale | |
| 8,787,586 B2 | 7/2014 | Hamada | |
| 9,070,282 B2 | 6/2015 | Clough | |
| 9,098,984 B2 | 8/2015 | Heubel | |
| 9,135,791 B2 | 9/2015 | Nakamura | |
| 9,436,280 B2 | 9/2016 | Tartz | |
| 9,459,632 B2 | 10/2016 | Houston | |
| 9,630,098 B2 | 4/2017 | Mikhailov | |
| 9,753,537 B2 | 9/2017 | Obana | |
| 9,792,501 B1 | 10/2017 | Maheriya | |
| 9,846,484 B2 | 12/2017 | Shah | |
| 9,946,347 B2 | 4/2018 | Nakagawa | |
| 9,952,670 B2 | 4/2018 | Watanabe | |
| 9,983,671 B2 | 5/2018 | Adachi | |
| 10,109,161 B2 | 10/2018 | Shah | |
| 10,150,029 B2 | 12/2018 | Yamano | |
| 10,175,761 B2 | 1/2019 | Cruz-Hernandez | |
| 10,347,093 B2 | 7/2019 | Rihn | |
| 10,394,326 B2 | 8/2019 | Ono | |
| 10,444,837 B2 | 10/2019 | Takeda | |
| 10,969,867 B2 | 4/2021 | Nakagawa | |
| 10,981,053 B2 | 4/2021 | Nakagawa | |
| 11,013,990 B2 | 5/2021 | Nakagawa | |
| 11,145,172 B2 | 10/2021 | Nakagawa | |
| 11,198,059 B2 | 12/2021 | Konishi | |
| 11,253,776 B2 | 2/2022 | Enokido | |
| 11,260,286 B2 | 3/2022 | Enokido | |
| 2002/0030663 A1 | 3/2002 | Goldenberg | |
| 2002/0080112 A1 | 6/2002 | Braun | |
| 2002/0163498 A1 | 11/2002 | Chang | |
| 2003/0030619 A1* | 2/2003 | Martin | G06F 3/016 345/156 |
| 2003/0212555 A1 | 11/2003 | van Santen | |
| 2004/0220812 A1 | 11/2004 | Bellomo | |
| 2005/0134562 A1 | 6/2005 | Grant | |
| 2007/0091063 A1 | 4/2007 | Nakamura | |
| 2007/0248235 A1 | 10/2007 | Hamada | |
| 2007/0253178 A1 | 11/2007 | Uchiumi | |
| 2008/0064500 A1 | 3/2008 | Satsukawa | |
| 2008/0204266 A1* | 8/2008 | Malmberg | H04M 1/72427 340/683 |
| 2008/0262658 A1 | 10/2008 | Ding | |
| 2009/0017911 A1 | 1/2009 | Miyazaki | |
| 2010/0016077 A1 | 1/2010 | Longdale | |
| 2010/0056208 A1 | 3/2010 | Ashida | |
| 2010/0085462 A1 | 4/2010 | Sako | |
| 2010/0090815 A1 | 4/2010 | Yamaya | |
| 2010/0101480 A1 | 4/2010 | Sugahara | |
| 2010/0245237 A1 | 9/2010 | Nakamura | |
| 2011/0012717 A1* | 1/2011 | Pance | G06F 3/04886 340/407.2 |
| 2011/0039606 A1 | 2/2011 | Kim | |
| 2011/0075835 A1 | 3/2011 | Hill | |
| 2011/0163946 A1 | 7/2011 | Tartz | |
| 2012/0028710 A1 | 2/2012 | Furukawa | |
| 2012/0232780 A1* | 9/2012 | Delson | A63F 13/06 701/400 |
| 2012/0281849 A1 | 11/2012 | Hamada | |
| 2013/0057509 A1 | 3/2013 | Cruz-Hernandez | |
| 2013/0250502 A1 | 9/2013 | Tossavainen | |
| 2013/0261811 A1 | 10/2013 | Yagi | |
| 2014/0169795 A1 | 6/2014 | Clough | |
| 2014/0176415 A1 | 6/2014 | Buuck | |
| 2014/0220520 A1 | 8/2014 | Salamini | |
| 2014/0266644 A1 | 9/2014 | Heubel | |
| 2014/0361956 A1 | 12/2014 | Mikhailov | |
| 2014/0378191 A1* | 12/2014 | Hosoi | H04M 1/03 455/574 |
| 2015/0042484 A1 | 2/2015 | Bansal | |
| 2015/0059086 A1 | 3/2015 | Clough | |
| 2015/0070261 A1 | 3/2015 | Saboune | |
| 2015/0081110 A1 | 3/2015 | Houston | |
| 2015/0273322 A1* | 10/2015 | Nakagawa | A63F 13/285 463/37 |
| 2015/0297990 A1 | 10/2015 | Mahlmeister | |
| 2015/0302854 A1 | 10/2015 | Clough | |
| 2015/0323996 A1 | 11/2015 | Obana | |
| 2015/0356838 A1 | 12/2015 | Obana | |
| 2016/0012687 A1 | 1/2016 | Obana | |
| 2016/0054797 A1 | 2/2016 | Tokubo | |
| 2016/0124707 A1 | 5/2016 | Ermilov | |
| 2016/0132117 A1 | 5/2016 | Asachi | |
| 2016/0144404 A1 | 5/2016 | Houston | |
| 2016/0162025 A1 | 6/2016 | Shah | |
| 2016/0214007 A1 | 7/2016 | Yamashita | |
| 2016/0258758 A1 | 9/2016 | Enokido | |
| 2016/0310844 A1 | 10/2016 | Yamashita | |
| 2016/0342213 A1 | 11/2016 | Endo | |
| 2017/0038841 A1* | 2/2017 | Takeda | G06F 3/041 |
| 2017/0045991 A1 | 2/2017 | Watanabe | |
| 2017/0053502 A1 | 2/2017 | Shah | |
| 2017/0061784 A1 | 3/2017 | Clough | |
| 2017/0087458 A1 | 3/2017 | Nakagawa | |
| 2017/0092084 A1 | 3/2017 | Rihn | |
| 2017/0097681 A1* | 4/2017 | Ono | G06F 3/0488 |
| 2017/0136354 A1 | 5/2017 | Yamano | |
| 2017/0139479 A1* | 5/2017 | Shimotani | G09B 21/003 |
| 2017/0180863 A1* | 6/2017 | Biggs | H04R 1/1075 |
| 2017/0205883 A1 | 7/2017 | Tanaka | |
| 2017/0235364 A1 | 8/2017 | Nakamura | |
| 2017/0242486 A1 | 8/2017 | Grant | |
| 2018/0028911 A1* | 2/2018 | Aoki | A63F 13/23 |
| 2018/0067313 A1 | 3/2018 | Sako | |
| 2018/0098583 A1 | 4/2018 | Keller | |
| 2018/0203509 A1 | 7/2018 | Yamano | |
| 2018/0345131 A1* | 12/2018 | Yamashita | A63F 13/5258 |
| 2018/0369865 A1 | 12/2018 | Shoji | |
| 2019/0105563 A1 | 4/2019 | Yamano | |
| 2019/0278372 A1 | 9/2019 | Nakagawa | |
| 2019/0332174 A1 | 10/2019 | Nakagawa | |
| 2019/0334426 A1* | 10/2019 | Culbertson | G06F 3/016 |
| 2019/0369730 A1 | 12/2019 | Marchant | |
| 2020/0061459 A1 | 2/2020 | Nakagawa | |
| 2020/0061460 A1 | 2/2020 | Nakagawa | |
| 2020/0070047 A1 | 3/2020 | Nakagawa | |
| 2020/0122028 A1 | 4/2020 | Konishi | |
| 2020/0225755 A1 | 7/2020 | Lee | |
| 2020/0238168 A1 | 7/2020 | Konishi | |
| 2020/0238169 A1 | 7/2020 | Konishi | |
| 2020/0246692 A1 | 8/2020 | Nakagawa | |
| 2020/0282310 A1 | 9/2020 | Nakagawa | |
| 2020/0324194 A1 | 10/2020 | Enokido | |
| 2020/0324195 A1 | 10/2020 | Enokido | |
| 2020/0359687 A1 | 11/2020 | Scatterday | |
| 2021/0121776 A1 | 4/2021 | Nakagawa | |

FOREIGN PATENT DOCUMENTS

| | | | |
|---|---|---|---|
| CN | 106133650 A | 11/2016 | |
| JP | 0884858 A | 4/1996 | |
| JP | 11226265 A | 8/1999 | |
| JP | 2002199056 A | 7/2002 | |
| JP | 2003228453 A | 8/2003 | |
| JP | 2004129120 A | 4/2004 | |
| JP | 2004157944 A | 6/2004 | |
| JP | 2005058404 A | 3/2005 | |
| JP | 2005190465 A | 7/2005 | |
| JP | 2005332063 A | 12/2005 | |
| JP | 3132531 U | 6/2007 | |
| JP | 2007324829 A | 12/2007 | |
| JP | 2009037582 A | 2/2009 | |
| JP | 2009183751 A | 8/2009 | |
| JP | 2011501296 A | 1/2011 | |
| JP | 2011183374 A | 9/2011 | |
| JP | 2012103852 | 5/2012 | |
| JP | 2012226482 A | 11/2012 | |
| JP | 2013507059 A | 2/2013 | |

(56) References Cited

FOREIGN PATENT DOCUMENTS

| | | |
|---|---|---|
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015118605 A | 6/2015 |
| JP | 2015121983 A | 7/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.
Office Action for related U.S. Appl. No. 16/500,651, 7 pages, dated Apr. 16, 2020.
International Search Report for related PCT Application No. PCT/JP2017/044074, 4 pages, dated Jan. 16, 2018.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for related PCT Application No. PCTJP2017044074, 12 pages, dated Jun. 18, 2019.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for related PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
International Preliminary Report on Patentability and Written Opinion for related PCT Application No. PCT/JP2017/016552, 13 pages, dated Nov. 2019.
International Search Report for corresponding PCT Application No. PCT/JP2017/030344, 4 pages, dated Oct. 10, 2017.
International Preliminary Report on Patentability and Written Opinion for corresponding PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
Office Action for related U.S Appl. No. 16/345,071, 10 pages, dated Feb. 19, 2020.
Notice of Reasons for Refusal for corresponding JP Application No. 2019-537506, 4 pages dated Nov. 18, 2020.
The First Office Action for corresponding CN Application No. 201780093973.6, 16 pages, dated Feb. 22, 2023.

\* cited by examiner

FIG.3
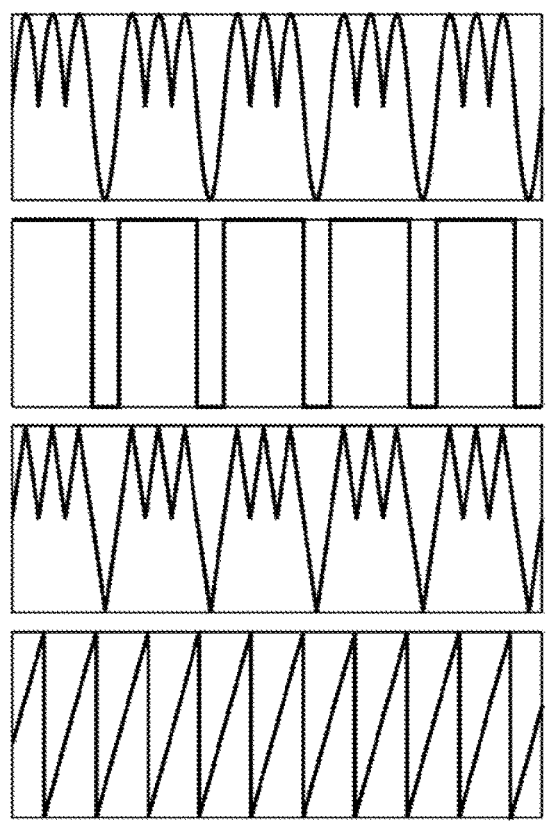
FIG.4
TACTILE SENSORY WAVEFORM 
UNADJUSTED PSEUDO FORCE SENSORY WAVEFORM 
ADJUSTED PSEUDO FORCE SENSORY WAVEFORM 

FIG.8
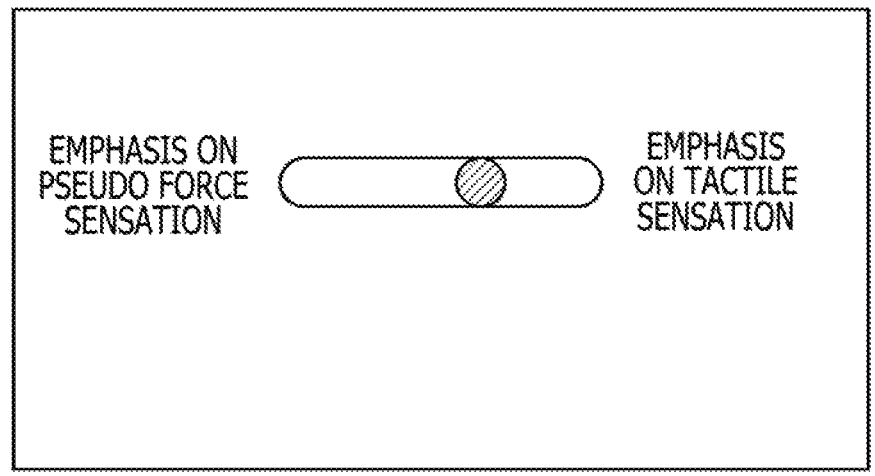
FIG.9
(a)
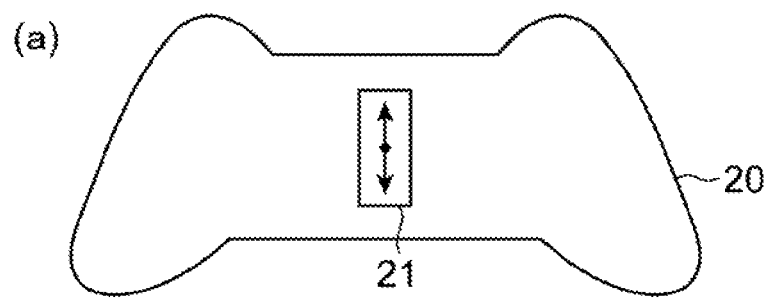
(b)
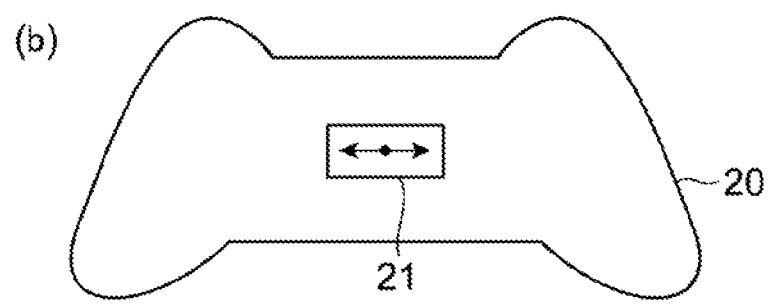

VIBRATION CONTROL APPARATUS

TECHNICAL FIELD

The present invention relates to a vibration device used for presenting a pseudo force sensation to a user, a vibration control apparatus for controlling the vibration device, a vibration device control method, and a control program.

BACKGROUND ART

In some cases, a device used while it is attached to or held by the body of a user, such as an operating device connected to a home gaming machine for use, includes a vibration mechanism for vibrating a part or the whole of the device. Such a vibration device is used to present, for example, a tactile sensation to the user. Here, the tactile sensation represents the feel of a virtual object touched by the user or a change or impact applied to the virtual object, and is a vibrational expression for expressing, for example, the vibration, feel, or texture of a gun.

SUMMARY

Technical Problem

When a vibration device based on the above-mentioned conventional technology is vibrated according to a particular vibration waveform, the user is presented a sensation (hereinafter referred to as the pseudo force sensation) that a force (traction force) is seemingly applied to pull the vibration device in a particular direction. However, a method of causing a single device to present both the tactile sensation and the pseudo force sensation to the user has not been sufficiently studied.

The present invention has been made in view of the above circumstances. An object of the present invention is to provide a vibration control apparatus capable of causing a vibration device to present both the tactile sensation and the pseudo force sensation to a user, a vibration device, a vibration device control method, and a control program.

Solution to Problem

A vibration control apparatus according to the present invention is a vibration control apparatus for vibrating a vibration mechanism, and includes a pseudo force sensory vibration data acquisition section, a tactile sensory vibration data acquisition section, and a vibration control section. The pseudo force sensory vibration data acquisition section acquires pseudo force sensory vibration data descriptive of a pseudo force sensory vibration causing a user to feel a pseudo force sensation. The tactile sensory vibration data acquisition section acquires tactile sensory vibration data descriptive of a tactile sensory vibration causing the user to feel a tactile sensation. The vibration control section causes the vibration mechanism to generate a vibration based on the pseudo force sensory vibration data and the tactile sensory vibration data.

A vibration device according to the present invention includes a vibration mechanism, a vibration data acquisition section, and a vibration control section. The vibration data acquisition section acquires vibration data including a description of a pseudo force sensory vibration causing a user to feel a pseudo force sensation and a description of a tactile sensory vibration causing the user to feel a tactile sensation. The vibration control section causes the vibration mechanism to generate a vibration based on the acquired vibration data.

A method of controlling a vibration mechanism according to the present invention includes the steps of: acquiring pseudo force sensory vibration data descriptive of a pseudo force sensory vibration causing a user to feel a pseudo force sensation; acquiring tactile sensory vibration data descriptive of a tactile sensory vibration causing the user to feel a tactile sensation; and causing the vibration mechanism to generate a vibration based on the pseudo force sensory vibration data and the tactile sensory vibration data.

A program according to the present invention is a program for controlling a vibration mechanism. The program causes a computer to function as a pseudo force sensory vibration data acquisition section, a tactile sensory vibration data acquisition section, and a vibration control section. The pseudo force sensory vibration data acquisition section acquires pseudo force sensory vibration data descriptive of a pseudo force sensory vibration causing a user to feel a pseudo force sensation. The tactile sensory vibration data acquisition section acquires tactile sensory vibration data descriptive of a tactile sensory vibration causing the user to feel a tactile sensation. The vibration control section causes the vibration mechanism to generate a vibration based on the pseudo force sensory vibration data and the tactile sensory vibration data. The program may be stored and supplied on a computer-readable, non-transitory information recording medium.

BRIEF DESCRIPTION OF DRAWINGS

FIG. 3 is a diagram illustrating concrete examples of waveforms for generating a pseudo force sensation.

FIG. 4 is a diagram illustrating an exemplary process of adjusting the amplitude of a pseudo force sensory waveform.

FIG. 8 is a diagram illustrating an example of a setting information input screen.

FIG. 9 is a set of diagrams illustrating exemplary arrangements of a vibration mechanism.

DESCRIPTION OF EMBODIMENT

An embodiment of the present invention will now be described with reference to the accompanying drawings.

A vibration control system 1 according to an example of the embodiment of the present invention includes a vibration control apparatus 10 and a vibration device 20. The vibration device 20 is connected to the vibration control apparatus 10.

The vibration device 20 is used while it is held by a hand of a user or attached to the body of the user. The vibration device 20 has a built-in vibration mechanism 21. The vibration mechanism 21 is operated to present a vibration to the user. The vibration mechanism 21 may be a linear resonance actuator, a voice coil motor, an eccentric motor, or another vibration generation element. The vibration device 20 may include various operating members to be operated by the user, such as an operating button and a lever. Here, it is assumed as a concrete example that the vibration device 20 includes only one built-in vibration mechanism 21 for generating a vibration along one axis and is able to present a pseudo force sensation along such a vibration direction.

Figure 1:
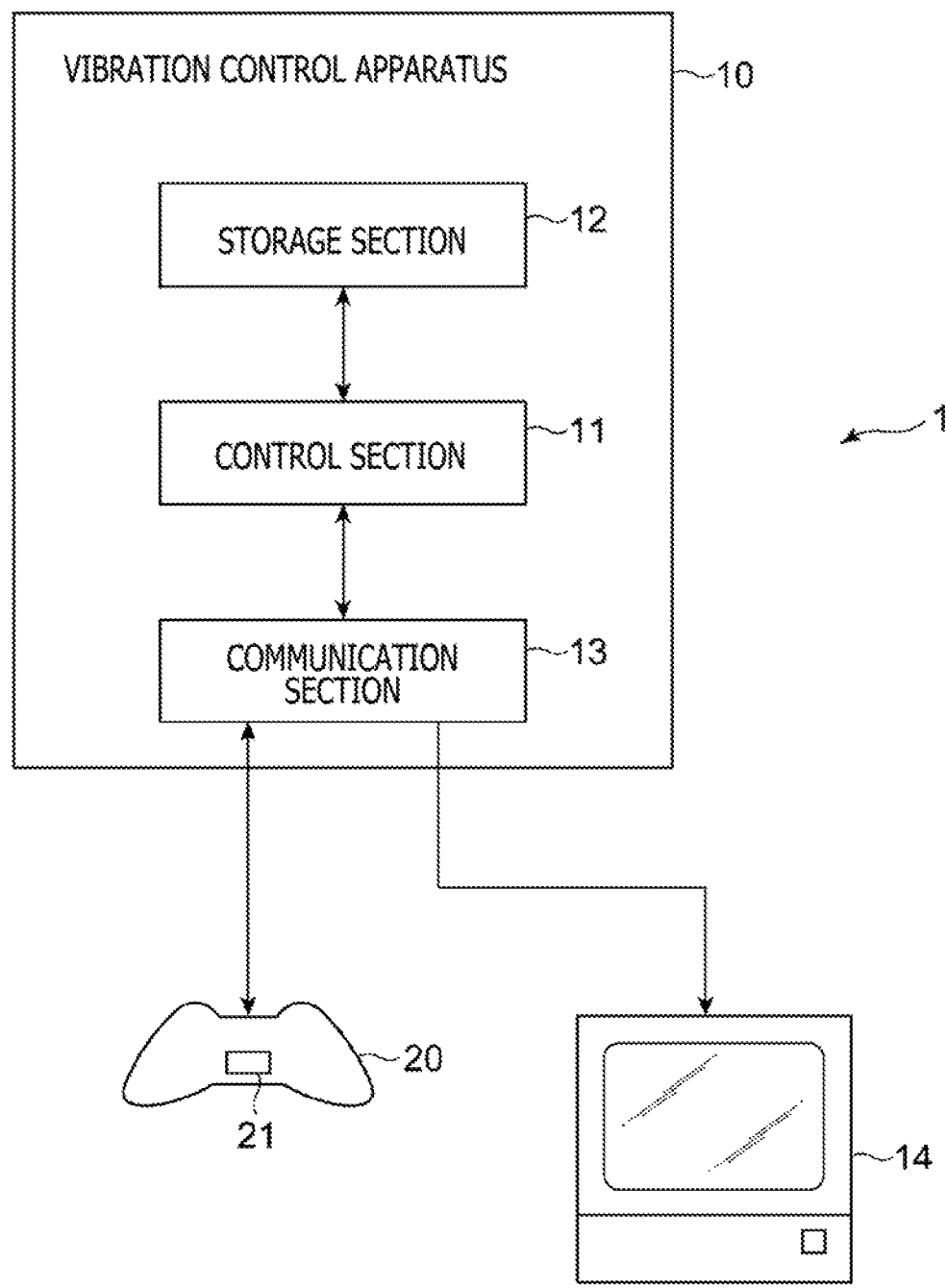
FIG. 1 is a block diagram illustrating an exemplary configuration of a vibration control system including a vibration control apparatus according to an embodiment of the present invention.

The vibration control apparatus 10 is an information processing apparatus communicatively connected to the vibration device 20. Thus, the vibration control apparatus 10 may be, for example, a home gaming machine or a personal computer. In the present embodiment, the vibration control apparatus 10 is further communicatively connected to a display apparatus 14. As illustrated in FIG. 1, the vibration control apparatus 10 includes a control section 11, a storage section 12, and a communication section 13.

The control section 11 includes a program control device such as a central processing unit (CPU), and performs various information processes in accordance with a program stored in the storage section 12. Concrete examples of processes performed by the control section 11 will be described in detail later.

The storage section 12 is, for example, a memory device, and stores the program to be executed by the control section 11. The program may be stored on a computer-readable, non-transitory storage medium, supplied, and copied into the storage section 12. The storage section 12 further operates as a work memory for the control section 11.

The communication section 13 includes a universal serial bus (USB) or another serial interface or a Bluetooth (registered trademark) or another wireless communication interface. The vibration control apparatus 10 is communicatively connected to the vibration device 20 through the communication section 13. In the present embodiment, particularly, the communication section 13 transmits a control signal for operating the vibration mechanism 21 to the vibration device 20 in accordance with an instruction from the control section 11. Further, the communication section 13 includes a communication interface for wiredly or wirelessly communicating with the display apparatus 14. The vibration control apparatus 10 transmits video data, which is to be displayed on the display apparatus 14, to the display apparatus 14 through the communication section 13.

The display apparatus 14 displays video based on a video signal transmitted from the vibration control apparatus 10. The display apparatus 14 may be, for example, a head-mounted display or another similar device worn on the head of the user.

Figure 2:
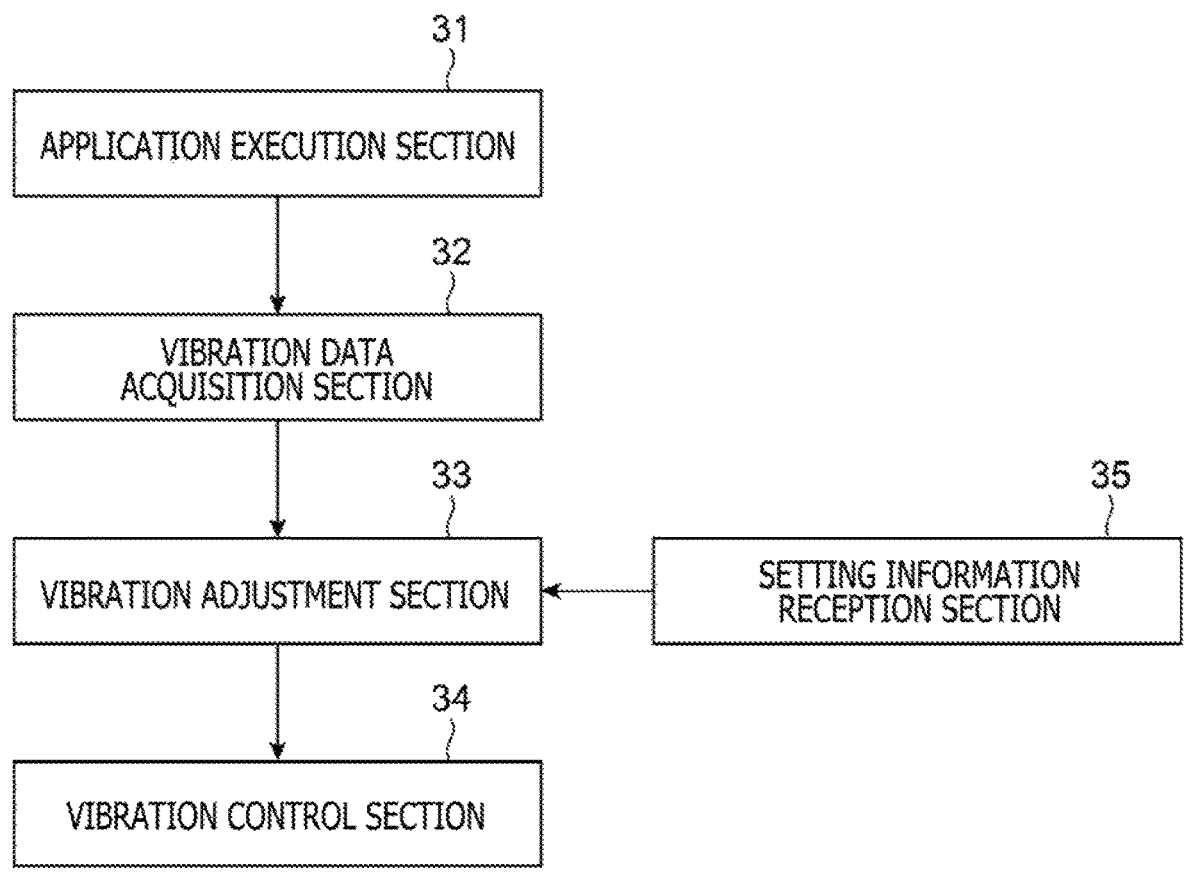
FIG. 2 is a functional block diagram illustrating the functions of the vibration control apparatus according to the embodiment of the present invention.

Operations of the control section 11 in the vibration control apparatus 10 will now be described. As illustrated in FIG. 2, the control section 11 in the present embodiment functionally includes an application execution section 31, a vibration data acquisition section 32, a vibration adjustment section 33, a vibration control section 34, and a setting information reception section 35. The functions of these sections are implemented when the control section 11 operates in accordance with the program stored in the storage section 12. The program may be supplied to the vibration control apparatus 10 through the Internet or other communication network, or stored on an optical disk or another computer-readable information storage medium and supplied to the vibration control apparatus 10.

The application execution section 31 is implemented when the control section 11 executes an application program such as a game. The application execution section 31 performs various processes in accordance with user operations performed on the vibration device 20, and displays the results of such processes on the screen of the display apparatus 14. For example, the application execution section 31 may build a virtual space where various virtual objects are disposed, and present an image depicting the inside of the virtual space to the user.

Further, in accordance with a process performed by the application execution section 31, the application execution section 31 outputs vibration instruction data including an instruction (vibration instruction) for vibrating the vibration device 20. The vibration instruction data may include, for example, data that is obtained by encoding the waveform of the vibration to be generated by the vibration mechanism 21. In such an instance, the amplitude and the frequency of the waveform determine the actual operation mode of the vibration mechanism 21. The vibration instruction data described above may be written in a format similar to that of voice data. Further, the vibration instruction data may include a waveform representative of the vibration of a plurality of frequencies, as is the case with the voice data. The vibration instruction data to be outputted from the application execution section 31 is stored in a buffer region provided in the storage section 12. The application execution section 31 may output one cycle (or multiple cycles) of vibration instruction data at each predetermined time point for drawing a frame image to be displayed on the display apparatus 14 or for communicating periodically with the vibration device 20. Further, each time the vibration instruction data is outputted without regard to the above-mentioned time point, the outputted vibration instruction data may include the description of vibration that is to be generated continuously for a certain period of time.

The present embodiment assumes that the vibration instruction data outputted from the application execution section 31 includes two types of data, namely, pseudo force sensory vibration data and tactile sensory vibration data.

The pseudo force sensory vibration data is descriptive of a vibration that causes the user to feel a force (traction force) for pulling in a particular direction (this vibration is hereinafter referred to as the pseudo force sensory vibration). More specifically, the pseudo force sensory vibration is a vibration that is generated by repeating, at predetermined intervals, a waveform having a specific pattern (this waveform is hereinafter referred to as the basic waveform) formed, for example, of a sine wave, a triangular wave, a sawtooth wave, or a rectangular wave. FIG. 3 illustrates exemplary waveforms for generating a pseudo force sensation in the above-described manner. Generating the above-described vibration causes the user to feel the pseudo force sensation in the direction of the vibration. The pseudo force sensory vibration data includes data that is descriptive of a vibration generated by repeating the above-mentioned basic waveform.

The tactile sensory vibration data is descriptive of a vibration that causes the user to feel a sensation (tactile sensation) as if the user has touched a certain object (this vibration is hereinafter referred to as the tactile sensory vibration). In general, the vibration causing the user to feel a tactile sensation is different from the vibration causing the user to feel the pseudo force sensation and is often generated by combining waveforms having a plurality of frequencies.

The vibration data acquisition section 32 acquires the pseudo force sensory vibration data and the tactile sensory vibration data, which are both outputted from the application execution section 31. More specifically, the vibration data acquisition section 32 acquires the vibration data by sequentially reading the vibration data that stored in the buffer region by the application execution section 31. The vibration data acquisition section 32 may read the vibration data, which is outputted at certain intervals from the application execution section 31, at the same intervals, or read the vibration data after allowing it to be buffered for a certain period of time.

In a case where an instruction for simultaneously generating the pseudo force sensory vibration and the tactile sensory vibration is issued by the application execution section 31, the vibration adjustment section 33 performs an adjustment process on the pseudo force sensory vibration data and tactile sensory vibration data to be acquired by the vibration data acquisition section 32 in order to make a necessary vibration adjustment. Further, the adjusted pseudo force sensory vibration data and tactile sensory vibration data are combined to generate control data (hereinafter referred to as the combined vibration data) for instructing the type of vibration to be generated by the vibration device 20. A concrete example of the adjustment process performed by the vibration adjustment section 33 will be described later.

The vibration control section 34 causes the vibration device 20 to generate a vibration based on the combined vibration data generated by the vibration adjustment section 33 by outputting a control command for instructing the vibration to the vibration device 20. In a case where only either the pseudo force sensory vibration or the tactile sensory vibration is instructed, the vibration control section 34 outputs, to the vibration device 20, a control command for instructing the vibration merely based on individual vibration data acquired by the vibration data acquisition section 32.

The vibration device 20 generate a vibration having a strength and frequency based on the vibration instruction by operating the vibration mechanism 21 in accordance with the control command outputted from the vibration control section 34. This makes it possible to vibrate the main body of the vibration device 20 in accordance, for example, with the situation of a game executed by the application execution section 31 according to the present embodiment, and present the resulting vibration to the user. In the present embodiment, particularly, the vibration device 20 is able to simultaneously present both a tactile sensation and a pseudo force sensation to the user by generating a vibration based on the combined vibration data. In such an instance, the vibration device 20 does not need to distinguish whether the pseudo force sensory vibration or the tactile sensory vibration is designated by the instruction issued from the vibration control section 34. The vibration device 20 merely has to generate a vibration based on the received control command. As a result, control can be exercised so as to present a pseudo force sensation or a tactile sensation to the user.

As regards the adjustment process to be performed by the vibration adjustment section 33, the setting information reception section 35 receives setting information inputted by the user. The function implemented by the setting information reception section 35 will be described in detail later.

Concrete examples of the adjustment process performed by the vibration adjustment section 33 will now be described. Basically, the vibration adjustment section 33 generates the waveform of the vibration to be actually generated by the vibration device 20 by combining two types of vibration waveforms identified based on two types of vibration data. More specifically, the vibration adjustment section 33 generates a single vibration waveform by combining a vibration waveform identified based on the pseudo force sensory vibration data (this waveform is hereinafter referred to as the pseudo force sensory waveform) and a vibration waveform designated based on the tactile sensory vibration data (this waveform is hereinafter referred to as the tactile sensory waveform). The vibration waveform generated in the above manner specifies the vibration to be actually generated by the vibration mechanism 21. However, if the two waveforms are merely combined without processing them at all, either the pseudo force sensation or the tactile sensation may not easily be felt. Therefore, when combining the two waveforms, the vibration adjustment section 33 may perform the adjustment process for changing at least one of the two waveforms until it is different from a former state identified by the original vibration data. Some concrete examples of the adjustment process are described below.

First of all, concrete examples of adjusting the pseudo force sensory vibration in accordance with the tactile sensory vibration will be described. As a first example, the vibration adjustment section 33 may vary the amplitude of the pseudo force sensory waveform in accordance with the magnitude of the amplitude of the tactile sensory waveform. More specifically, for example, the vibration adjustment section 33 identifies the maximum amplitude of the tactile sensory waveform at unit time intervals. Then, the vibration adjustment section 33 determines the magnitude of the amplitude of the pseudo force sensory waveform in accordance with the magnitude of the identified maximum amplitude. Further, the vibration adjustment section 33 changes the scale of the pseudo force sensory waveform at unit time intervals until it matches the determined magnitude of the amplitude.

FIG. 4 is a diagram illustrating an exemplary adjustment process in the present example. The upper part of FIG. 4 depicts a tactile sensory waveform, the middle part depicts an unadjusted pseudo force sensory waveform, and the lower part depicts a pseudo force sensory waveform that has been subjected to the adjustment process. At a time point where the pseudo force sensory vibration begins, FIG. 4 sharpens the rise of the waveform to emphasize that the presentation of the pseudo force sensation is started. Subsequently, the amplitude of the pseudo force sensory waveform remains high during a time interval while the amplitude of the tactile sensory waveform is fairly high. However, when the amplitude of the tactile sensory waveform lowers with time, a correction is made to lower the amplitude of the pseudo force sensory waveform as well. Combining the tactile sensory waveform depicted in the upper part with the adjusted pseudo force sensory waveform depicted in the lower part makes it possible to prevent the generation of an unnecessarily great vibration for the presentation of the pseudo force sensation while avoiding a situation where the pseudo force sensation is not easily felt by the user.

As a second example, the vibration adjustment section 33 may vary the length of the pseudo force sensory waveform so that the termination of the pseudo force sensory vibration is timed later than the termination of the tactile sensory vibration. In this example, the vibration adjustment section 33 identifies the respective time points where the simultaneously generated tactile sensory vibration and pseudo force sensory vibration terminate. If it is determined that the pseudo force sensory vibration terminates earlier than the tactile sensory vibration, the vibration adjustment section 33 repeats the basic waveform included in the pseudo force sensory waveform such that the pseudo force sensory vibration terminates later than the tactile sensory vibration.

Figure 5:
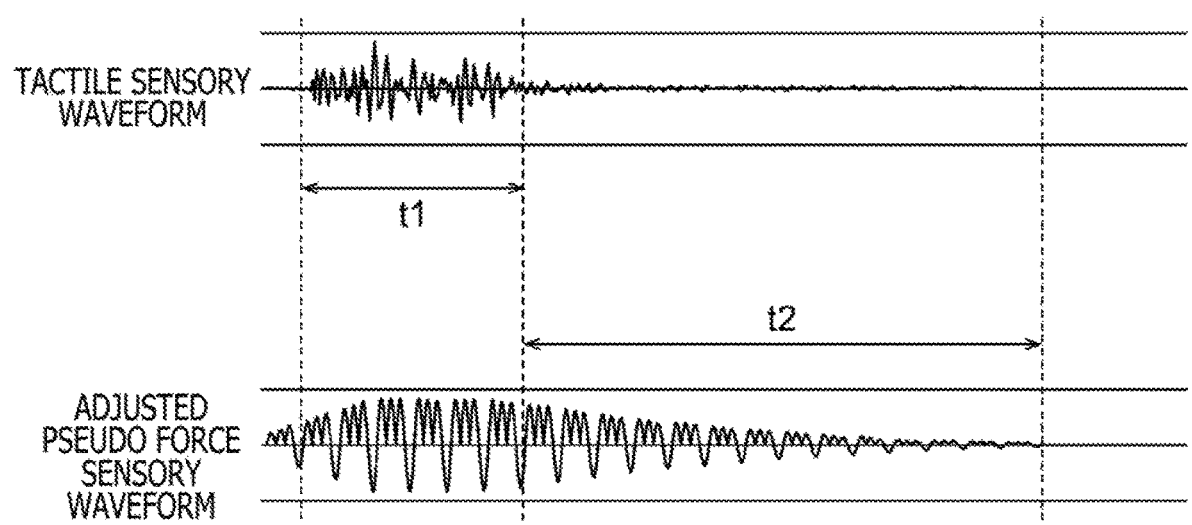
FIG. 5 is a diagram illustrating an exemplary process of adjusting the length of a pseudo force sensory waveform.

FIG. 5 is a diagram illustrating an exemplary adjustment process in the present example. The upper part of FIG. 5 depicts a tactile sensory waveform, and the lower part depicts an adjusted pseudo force sensory waveform. In this example, even after a tactile sensation is presented during a time interval t1, the basic waveform of the pseudo force sensory waveform is repeated during a time interval t2, which is subsequent to the time interval t1, such that the pseudo force sensory waveform persists after the termination of the tactile sensory waveform. Further, after the termination of the tactile sensory waveform, a correction is made to gradually lower the amplitude of the pseudo force sensory waveform. Making the above-described adjustment makes it possible to avoid a situation where the pseudo force sensation is not easily perceived by the user owing to the tactile sensory vibration.

As a third example, the vibration adjustment section 33 may change at least either the shape or frequency of the pseudo force sensory waveform in accordance with the tactile sensory vibration. As mentioned earlier, the basic waveform included in the pseudo force sensory waveform is variously shaped, that is, shaped, for example, like a sine wave, a sawtooth wave, a rectangular wave, or a combination of these waves. Under normal conditions, pseudo force sensory waveform data outputted from the application execution section 31 identifies the shape of the basic waveform. In the present example, the vibration adjustment section 33 changes the shape and/or frequency of the basic waveform, which is identified by the pseudo force sensory waveform data, to a different one in accordance with the tactile sensory vibration.

More specifically, the vibration adjustment section 33 identifies the main frequency component of the tactile sensory waveform by analyzing the frequency of the tactile sensory waveform by using, for example, a fast Fourier transform method. The vibration adjustment section 33 then changes the frequency of the pseudo force sensory waveform until it is close to the identified frequency. When the above-described adjustment is made, both the tactile sensation and the pseudo force sensation are easily felt by the user.

Further, if, in the above case, the changed frequency of the pseudo force sensory waveform is within a predetermined numerical value range, the vibration adjustment section 33 may invert the pseudo force sensory waveform. The reason is that the direction in which the user feels the pseudo force sensation reverses when the frequency of the pseudo force sensory waveform is within a specific numerical value range. For example, in a case where the basic waveform of the pseudo force sensory waveform is formed of a sawtooth wave, it is known that the direction in which the user feels the pseudo force sensation when the frequency of the pseudo force sensory waveform is lower than a predetermined threshold frequency is opposite to the direction in which the user feels the pseudo force sensation when the frequency of the pseudo force sensory waveform is higher than the predetermined threshold frequency, no matter whether the shape of the waveform remains unchanged. Therefore, in a case where the adjusted frequency is within a frequency range that reverses the direction in which the user feels the pseudo force sensation, the vibration adjustment section 33 inverts the pseudo force sensory waveform. This makes it possible to present the pseudo force sensation in a direction intended by the application program while adjusting the frequency of the pseudo force sensory waveform in accordance with the frequency of the tactile sensory waveform. The pseudo force sensation is not easily felt in the vicinity of a threshold frequency that reverses the direction in which the pseudo force sensation is felt. Therefore, when adjusting the frequency of the pseudo force sensory waveform, the vibration adjustment section 33 may exercise control so that the adjusted frequency is not in the vicinity of the threshold frequency.

Moreover, the vibration adjustment section 33 may vary the shape of the basic waveform in accordance with the shape of the tactile sensory waveform. As a concrete example, the vibration adjustment section 33 analyzes the shape of the tactile sensory waveform to evaluate the trend of sharpness of a peak waveform. This evaluation can be achieved by using, for example, the amount of change in the amplitude. If the result of evaluation determines that there are many sharp peak waveforms, the basic waveform of the pseudo force sensory waveform is changed to a triangular or sawtooth wave in order to achieve similarity to the shape of the tactile sensory waveform. Conversely, if the evaluation result indicates that there are many dull peak waveforms, the basic waveform may be changed to the one that is formed of a sine wave.

Figure 6:
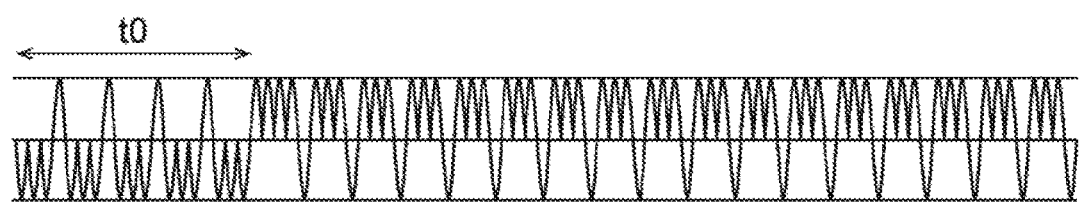
FIG. 6 is a diagram illustrating an exemplary adjustment process for accentuating the pseudo force sensation.

A concrete example of the adjustment process for presenting the pseudo force sensation to the user in an easy-to-perceive manner will now be described. In this example, the vibration adjustment section 33 adds a pseudo force sensory waveform for presenting a reverse pseudo force sensation to the beginning of the pseudo force sensory waveform. Here, the pseudo force sensory waveform for presenting the reverse pseudo force sensation is obtained by inverting the original pseudo force sensory waveform along the vibration direction. FIG. 6 depicts a concrete example of a changed pseudo force sensory waveform in the present example. Referring to FIG. 6, the pseudo force sensory waveform during a time interval t0 is obtained by inverting the original pseudo force sensory waveform in order to present the reverse pseudo force sensation.

When the reverse pseudo force sensation, which is a reversal of the original pseudo force sensation to be presented, is presented and then the direction of the pseudo force sensation is reversed as described above, it is possible to make the user feel the pseudo force sensation strongly. When, in particular, the above-described inverted pseudo force sensory waveform is added in a case where the pseudo force sensation is to be presented simultaneously with the tactile sensory waveform, the pseudo force sensation is more easily felt by the user. The vibration adjustment section 33 may add the above-described inverted pseudo force sensory waveform to the beginning of the pseudo force sensory waveform not only in a case where the pseudo force sensation is to be presented simultaneously with the tactile sensation, but also in a case where only the pseudo force sensory vibration is to be generated.

Conversely, an example of the adjustment process on a tactile sensory waveform will now be described. First of all, as a first example, an example of the adjustment process for reducing the vibration bias in a tactile sensory vibration is described below. In a case where the tactile sensory vibration has a vibration bias along the direction of pseudo force sensation presentation, that is, in a case where the tactile sensory waveform is shaped like an asymmetrical waveform that generates strong acceleration due to the direction of pseudo force sensation or the reverse of that direction, the tactile sensory waveform itself might cause the user to feel a pseudo force sensation. If such a tactile sensory vibration is generated simultaneously with a pseudo force sensory vibration, it is probable that the tactile sensory vibration may cancel or unintentionally intensify the pseudo force sensation. In the present example, therefore, the vibration adjustment section 33 adjusts the tactile sensory vibration to reduce the vibration bias.

Figure 7:
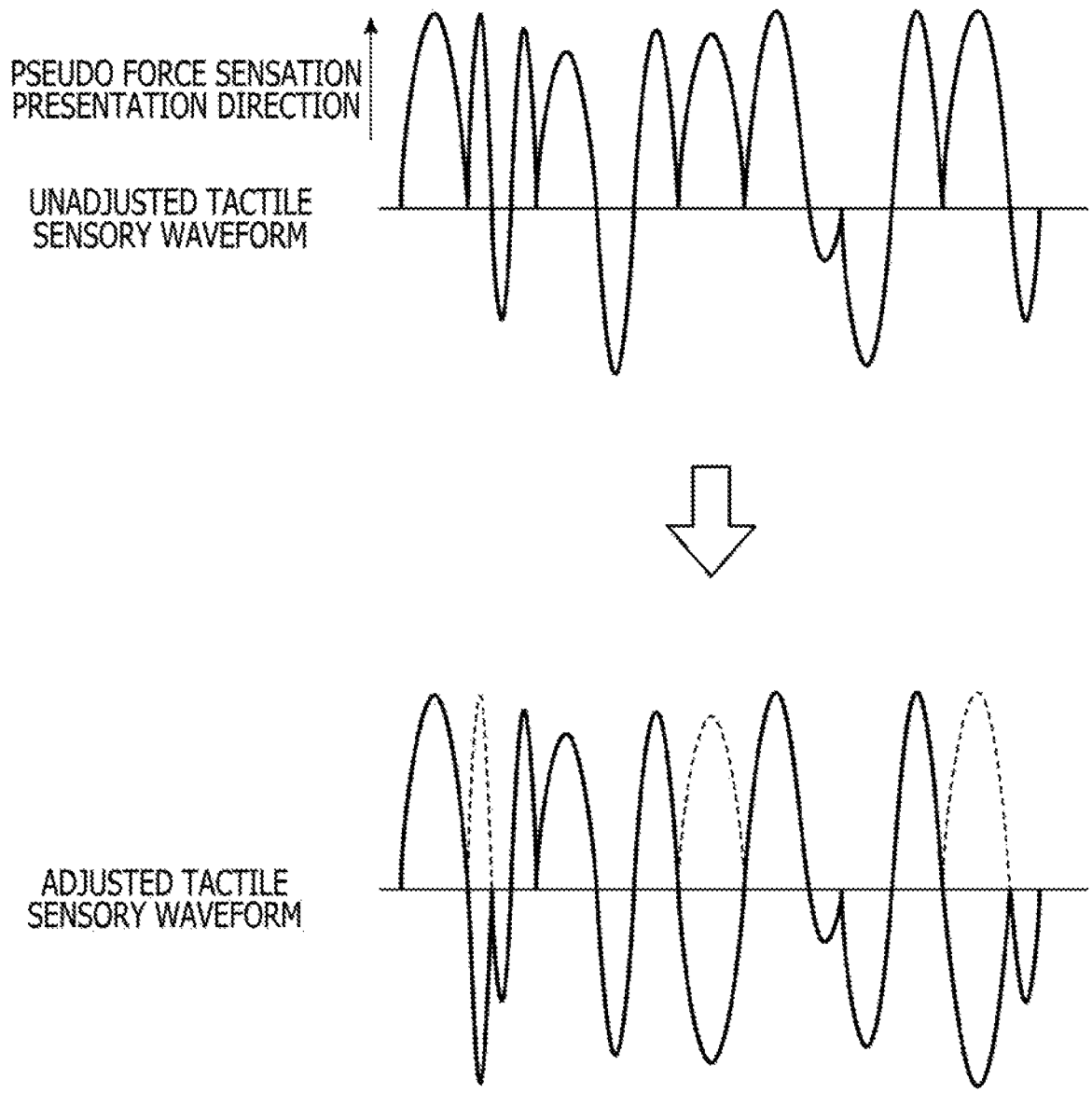
FIG. 7 is a diagram illustrating an exemplary adjustment process for reducing the bias of a tactile sensory waveform.

More specifically, the vibration adjustment section 33 analyzes the shape of the tactile sensory waveform at unit time intervals, and integrates the magnitude of the amplitude in the direction of pseudo force sensation presentation and in a direction opposite to that direction. The resulting integrated value corresponds to the area of a waveform peak with respect to a center point. If the difference between the integrated values obtained in the direction of pseudo force sensation presentation and in a direction opposite to that direction is equal to or greater than a predetermined ratio, it signifies that the tactile sensory waveform is asymmetrical. Therefore, the vibration adjustment section 33 makes a correction to resolve the vibration bias. FIG. 7 is a diagram illustrating the above-descried adjustment process. The upper part of FIG. 7 depicts an unadjusted tactile sensory waveform, and the lower part depicts an adjusted tactile sensory waveform. In FIG. 7, the upward direction is the direction of pseudo force sensation presentation, and the downward direction is a direction opposite to the direction of pseudo force sensation presentation. Broken lines in the adjusted tactile sensory waveform represent the unadjusted (uninverted) waveform. In the example of FIG. 7, the vibration bias exists in the direction of pseudo force sensation presentation. Therefore, the adjustment is made so as to invert a part of the waveform having a peak in the pseudo force sensation presentation direction symmetrically with respect to a central position. Performing the above-described adjustment process makes it possible to decrease the difference in waveform area between the pseudo force sensation presentation direction and a direction opposite to the pseudo force sensation presentation direction, and thus reduce the influence of the tactile sensory waveform upon pseudo force sensation presentation.

To ensure that the waveform is unlikely to become discontinuous in a case where the waveform to be adjusted is to be inverted, the waveform peak in the direction of pseudo force sensation presentation and the waveform peak in the opposite direction, which are successive to each other, may be collectively inverted. In this instance, the asymmetry of the tactile sensory waveform can be reduced because a relatively great peak and a relatively small peak are handled as a combination and collectively inverted.

Further, the vibration adjustment section 33 may perform the above-described adjustment process of reducing the vibration bias without regard to the presence of pseudo force sensory vibration. Even when no instruction is issued for pseudo force sensory vibration and only a tactile sensation is to be presented to the user, it is undesirable in some cases that the user feels a pseudo force sensation in a particular direction from the associated tactile sensory vibration. Accordingly, when generating a tactile sensory vibration, the vibration adjustment section 33 may constantly determine whether a vibration bias exists. If any vibration bias exists (i.e., if the user might feel the pseudo force sensation), the vibration adjustment section 33 may perform the above-described adjustment process of reducing the vibration bias. Particularly, in a case where a plurality of instructions for generating a tactile sensory vibration are simultaneously issued, a combination of such vibrations designated by the instructions may result in a vibration for generating a pseudo force sensation that is not initially intended by the application program. In such an instance, the generation of an unintended pseudo force sensation can be suppressed by performing the adjustment process of reducing the vibration bias.

As a second example of the adjustment process on a tactile sensory waveform, the adjustment process for attenuating specific frequency components of the tactile sensory waveform will now be described. When a pseudo force sensory waveform is combined with a waveform having a frequency close to that of the pseudo force sensory waveform, the combined waveforms might cancel each other to attenuate a pseudo force sensation. In such a situation, it is possible to prevent the tactile sensory waveform from canceling the pseudo force sensory waveform by attenuating frequency components of the tactile sensory waveform that are close to a vibration frequency included in the pseudo force sensory waveform.

More specifically, in a case where, for example, a pseudo force sensory waveform is generated based on an 80 Hz sine wave, the vibration adjustment section 33 attenuates 70 Hz to 90 Hz frequency components of a tactile sensory waveform that is presented simultaneously with the pseudo force sensory waveform. The vibration adjustment section 33 may completely delete the waveform having such specific frequency components or decrease its amplitude by a predetermined ratio. Further, the above-described adjustment process may be performed for the whole period overlapping with the period of pseudo force sensory waveform presentation or performed only for a period while the amplitude (envelope) of tactile sensory vibration is equal to or higher than a predetermined threshold value.

Alternatively, instead of attenuating only specific frequency components, the vibration adjustment section 33 may make an adjustment to attenuate the whole tactile sensory vibration for a predetermined period after the start of pseudo force sensory vibration presentation. This makes it possible to definitely present the pseudo force sensation to the user by suppressing the influence of tactile sensory vibration.

In accordance with the setting information received from the user, the vibration adjustment section 33 may adjust the strength of at least either pseudo force sensory vibration or tactile sensory vibration. In a case where a single vibration mechanism 21 is used to simultaneously present tactile sensation and pseudo force sensation, it may be difficult in some cases to present both of these sensations to the user at a sufficient output level due, for instance, to a dynamic range problem. Therefore, in the present example, the setting information reception section 35 exercises control to determine, based on the setting information received in advance from the user, whether to give priority to tactile sensation or to pseudo force sensation. In the present example, the setting information reception section 35 receives the setting information regarding the strengths of pseudo force sensory vibration and tactile sensory vibration, which is inputted from the user, and records the received setting information in the storage section 12. The vibration adjustment section 33 references the recorded setting information and adjusts the pseudo force sensory vibration and the tactile sensory vibration.

As a concrete example, it is assumed that the user specifies whether to emphasize tactile sensory vibration or pseudo force sensory vibration. FIG. 8 illustrates an example of a screen that accepts setting information inputted from the user. The user is allowed to operate a slider to specify a state where tactile sensory vibration is emphasized, a state where pseudo force sensory vibration is emphasized, or an intermediate state between the former two. In this instance, the setting information reception section 35 may receive, for example, one of three discrete values from the user or receive a continuously variable value specified by the user.

In a case where the user has specified a state where tactile sensory vibration is emphasized, the vibration adjustment section 33 makes an adjustment to intensify the tactile sensory vibration, and then combines the tactile sensory vibration with the pseudo force sensory vibration. Conversely, in a case where the user has specified a state where pseudo force sensory vibration is emphasized, the vibration adjustment section 33 makes an adjustment to intensify the pseudo force sensory vibration. This enables the vibration device 20 to present the tactile sensation and the pseudo force sensation to the user in a manner compatible with user preferences.

Here, it is assumed that the setting information reception section 35 receives, from the user, a single parameter indicative of whether to emphasize the tactile sensory vibration or the pseudo force sensory vibration. Alternatively, however, the setting information reception section 35 may receive parameters that respectively specify the strengths of the tactile sensory vibration and pseudo force sensory vibration. In such an instance, the vibration adjustment section 33 independently performs the adjustment process on each of the tactile sensory vibration and pseudo force sensory vibration in accordance with specified values of the parameters. Further, the setting information reception section 35 may receive, from the user, a setting that completely turns off either the tactile sensory vibration or the pseudo force sensory vibration.

The vibration adjustment section 33 may perform a part or the whole of the above-described plurality of types of the adjustment process in combination with one another.

The vibration adjustment section 33 may perform the above-described adjustment process in real time. More specifically, each time the vibration data acquisition section 32 acquires new vibration data that is outputted from the application execution section 31, the vibration adjustment section 33 determines based on the acquired vibration data whether or not adjustment is necessary, and perform a necessary adjustment process. Further, the vibration adjustment section 33 combines the tactile sensory vibration data and the pseudo force sensory vibration data, which are adjusted as needed, and outputs the combined vibration data to the vibration control section 34. As a result, a vibration properly adjusted based on a vibration required by the application execution section 31 and on a user-specified setting can be presented to the user even in a case where, for example, the description of a tactile sensory vibration and the direction of a pseudo force sensory vibration, which are to be presented based, for example, on a user input, vary in real time.

Alternatively, the vibration adjustment section 33 may perform, in advance, a part or the whole of the above-described adjustment process. More specifically, for example, the vibration adjustment section 33 stores, in the storage section 12, adjusted waveform data that is obtained by adjusting a default pseudo force sensory waveform prepared in advance as needed for a case where an instruction is issued for simultaneous presentation of pseudo force sensory waveform and tactile sensory waveform. When the application execution section 31 subsequently issues an instruction for the presentation of pseudo force sensory vibration, the adjusted waveform data is read in a case where the pseudo force sensory vibration is to be presented simultaneously with a tactile sensory vibration, or default pseudo force sensory waveform data is read in a case where only a pseudo force sensation is to be presented. In a case where an instruction for presenting the tactile sensory vibration is issued, the read adjusted waveform is combined with the tactile sensory waveform and then the resulting combination is outputted. This reduces the amount of processing to be performed in real time.

Further, in a case where the tactile sensory waveform is additionally prepared in advance, the vibration adjustment section 33 may generate, in advance, a combined waveform obtained by combining the adjusted pseudo force sensory waveform with the tactile sensory waveform, and store the resulting waveform data in the storage section 12. As a result, the prepared waveform data simply needs to be read and outputted in a case where the tactile sensory waveform and the pseudo force sensory waveform are to be simultaneously presented. This further reduces the amount of processing to be performed in real time. As described above, in a case where, for example, the tactile sensory waveform, the pseudo force sensory waveform, and a waveform combination of the former two are prepared, the application execution section 31 is able to issue an instruction for generating a vibration simply by specifying the type, strength, and length of the waveform to be presented.

The above description assumes that the tactile sensory vibration data and pseudo force sensory vibration data outputted from the application execution section 31 are combined by the vibration adjustment section 33 to generate the combined vibration data. However, the embodiment of the present invention is not limited to such a scheme. For example, the vibration adjustment section 33 may perform the above-described adjustment process on individual vibration data in accordance with the tactile sensory vibration data and the pseudo force sensory vibration data without performing a combination process of combining the above two different sets of vibration data. In such an instance, the vibration control section 34 transmits each of the adjusted tactile sensory vibration data and pseudo force sensory vibration data to the vibration device 20. Then, the tactile sensory vibration data and pseudo force sensory vibration data received by a control circuit built in the vibration device 20 are combined to generate the combined vibration data to thereby operate the vibration mechanism 21 in accordance with the combined vibration data. Even when control is exercised in the above manner, the vibration device 20 is able to present both the tactile sensation and the pseudo force sensation to the user in accordance with the adjustment.

Further, the above description assumes that the functions of the vibration data acquisition section 32 and vibration adjustment section 33 are implemented, for example, by a system program prepared separately from the application program. However, these functions may be implemented within the application program. In such a case, when the application execution section 31 is to present the tactile sensation and the pseudo force sensation to the user in accordance with the process to be performed by the application execution section 31, vibration data sets indicative of the associated vibrations are generated and acquired. Then, the adjustment process is performed as needed on both of the vibration data sets. In this example, too, the application execution section 31 may separately output the adjusted tactile sensory vibration data and pseudo force sensory vibration data or combine them and output the resulting combination as the combined vibration data. In either case, the vibration control section 34 transmits the outputted vibration data to the vibration device 20 to thereby generate a vibration based on the vibration data.

Moreover, the above description assumes that the tactile sensory vibration data and the pseudo force sensory vibration data each include encoded data indicative of an actual vibration waveform. However, the pseudo force sensory waveform is obtained by repeating the basic waveform. Therefore, it is not always necessary to include data indicative of an overall waveform shape. Accordingly, the pseudo force sensory vibration data may be data including various items of parameter information that identify, for example, the shape, magnitude of amplitude, and repetition cycle of the basic waveform. In this case, the vibration adjustment section 33 or the vibration device 20 references the parameter information included in the pseudo force sensory vibration data, generates an actual pseudo force sensory waveform, and combines it with a tactile sensory waveform to generate vibration data indicative of a vibration waveform that should be actually generated by the vibration mechanism 21.

Figure 10:
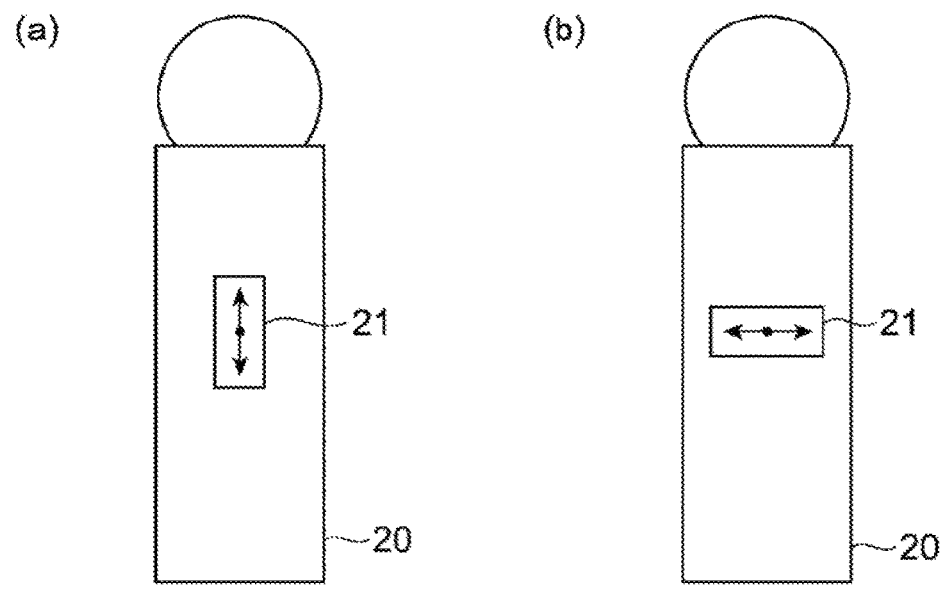
FIG. 10 is another set of diagrams illustrating exemplary arrangements of the vibration mechanism.

The foregoing description assumes that the vibration device 20 includes only a single built-in vibration mechanism 21 for generating a vibration along one axis. In this case, the vibration device 20 is able to present a pseudo force sensation that is oriented in two directions, namely, positive and negative directions, along a vibration axis. FIGS. 9 and 10 illustrate exemplary arrangements of the vibration mechanism 21 in the vibration device 20. Arrows in FIGS. 9 and 10 indicate the vibration direction. The pseudo force sensation can be generated in the directions indicated by the arrows.

Figure 11:
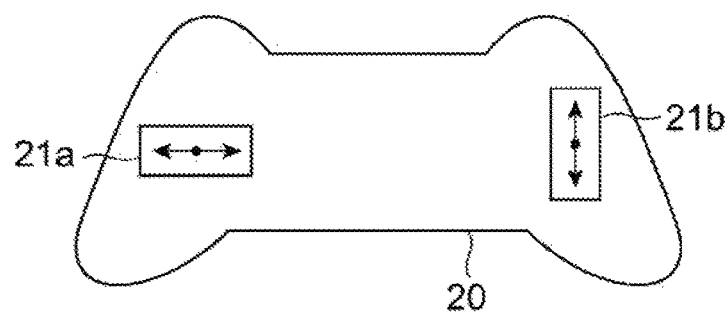
FIG. 11 is a diagram illustrating an exemplary arrangement of a plurality of vibration mechanisms.
Figure 12:
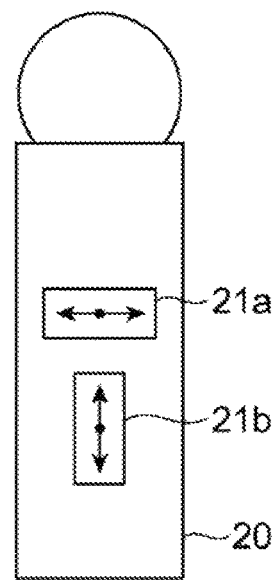
FIG. 12 is a diagram illustrating another exemplary arrangement of the plurality of vibration mechanisms.

However, the embodiment of the present invention is not limited to such a configuration. The vibration device 20 may include a plurality of built-in vibration mechanisms 21. FIG. 11 illustrates an exemplary arrangement of such vibration mechanisms 21. The vibration mechanisms 21a and 21b are respectively disposed on the left and right sides of the horizontally-long vibration device 20. In this case, the pseudo force sensation can be presented in various directions by orienting the vibration mechanisms 21 in different directions. More specifically, in the example of FIG. 11, the vibration mechanism 21a is oriented so as to generate a vibration along the left-right direction as viewed from above, and the vibration mechanism 21b is oriented so as to generate a vibration along the front-rear direction as viewed from above (i.e., oriented along a direction substantially orthogonal to the direction along which the vibration mechanism 21a is oriented). The above-described arrangement scheme makes it possible to present the pseudo force sensation in the front-rear direction and in the left-right direction. Further, operating the two vibration mechanisms 21a and 21b in combination makes it possible to present the pseudo force sensation in any 360-degree direction within a plane containing the vibration directions of the two vibration mechanisms 21. FIG. 12 illustrates an exemplary arrangement of the two vibration mechanisms 21 that are oriented in different directions and arranged vertically on the vertically-long vibration device 20. In this case, too, the pseudo force sensation can be generated in any direction within the plane containing the vibration directions of the two vibration mechanisms 21.

Figure 13:
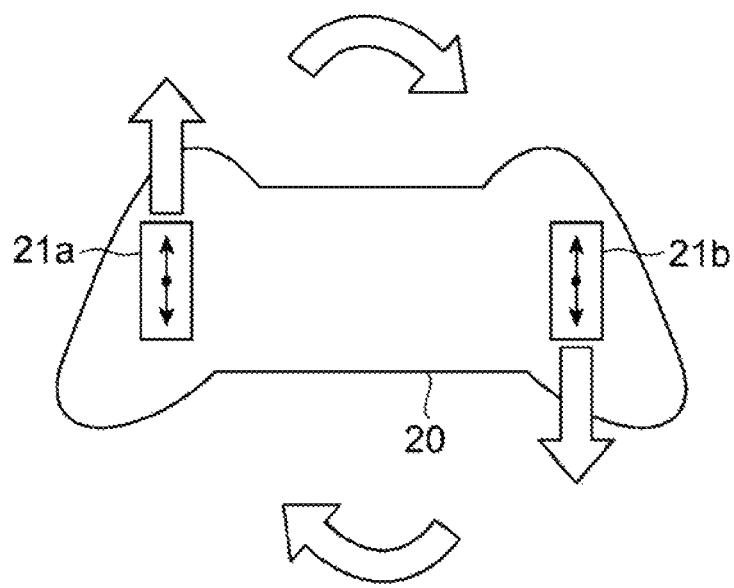
FIG. 13 is a diagram illustrating yet another exemplary arrangement of the plurality of vibration mechanisms.

The vibration device 20 may include a plurality of built-in vibration mechanisms 21 that generate vibrations in the same direction. When these vibration mechanisms 21 are positioned at a distance from each other and adapted to generate pseudo force sensations oriented in directions opposite to each other, the user may be made to feel that a force is applied to rotate the vibration device 20. FIG. 13 illustrates an exemplary arrangement in such a case. In the example of FIG. 13, the two vibration mechanisms 21a and 21b are disposed along the longitudinal direction (the left-right direction in FIG. 13) of the vibration device 20, as is the case with FIG. 11. However, in marked contrast to FIG. 11, the two vibration mechanisms 21a and 21b are both disposed to generate a vibration along a direction crossing the longitudinal direction of the vibration device 20 (i.e., along a direction crossing the direction of linking the two vibration mechanisms 21). When, as indicated by block arrows in the present example, an upward pseudo force sensation is generated by the vibration mechanism 21a and a downward pseudo force sensation is generated by the vibration mechanism 21b, the user may be made to feel that a force is applied to rotate the vibration device 20 in a clockwise direction. Further, when pseudo force sensations oriented in opposite directions are generated by the vibration mechanisms 21, the user may be made to feel that a force is applied to rotate the vibration device 20 in a counterclockwise direction. These vibration mechanisms 21 may be allowed to generate pseudo force sensations that are oriented in the same direction.

Figure 14:
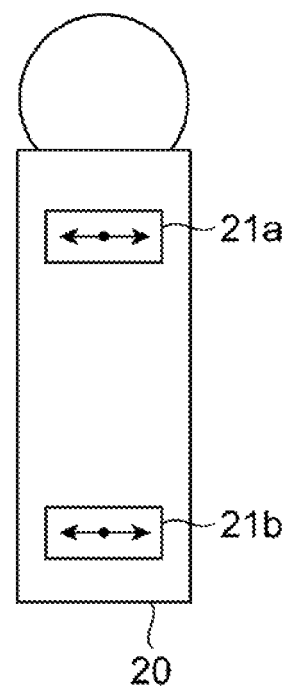
FIG. 14 is a diagram illustrating still another exemplary arrangement of the plurality of vibration mechanisms.

FIG. 14 illustrates an exemplary arrangement of a plurality of vibration mechanisms 21 that are capable of presenting a turning force to the vibration device 20 having the same shape as depicted in FIG. 12. In the example of FIG. 14, too, two vibration mechanisms 21 are disposed along the longitudinal direction of the vibration device 20, and each of the two vibration mechanisms 21 generates a vibration along a direction crossing the direction of linking the two vibration mechanisms 21. In this case, too, when the two vibration mechanisms 21 are operated so as to generate pseudo force sensations oriented in directions opposite to each other, a turning force for turning around an intermediate point between the two vibration mechanisms 21 may be presented to the user, as is the case with FIG. 13.

Figure 15:
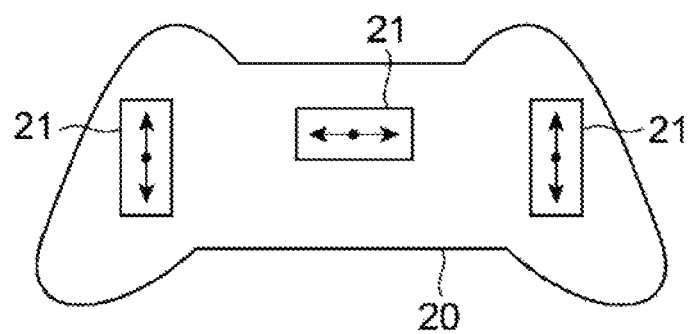
FIG. 15 is a diagram illustrating an additional exemplary arrangement of the plurality of vibration mechanisms.
Figure 16:
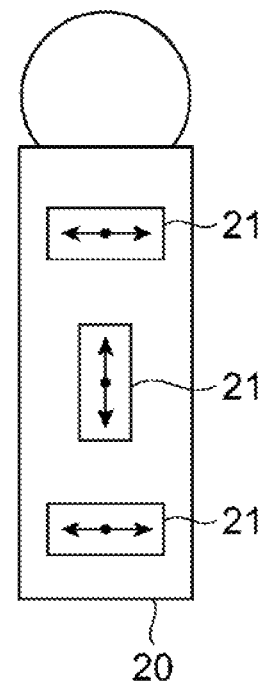
FIG. 16 is a diagram illustrating a yet additional exemplary arrangement of the plurality of vibration mechanisms.

The vibration device 20 may include three or more built-in vibration mechanisms 21. FIGS. 15 and 16 illustrate an exemplary arrangement in a case where three vibration mechanisms 21 are disposed in the vibration device 20. The examples of FIGS. 15 and 16 assume that the vibration directions of the three vibration mechanisms 21 are disposed in the same plane. However, one of the vibration mechanisms 21 may alternatively be disposed so as to vibrate in a direction crossing a plane containing the vibration directions of the other vibration mechanisms 21. This alternative arrangement scheme makes it possible to present a pseudo force sensation not only in any direction within the same plane, but also in any three-dimensional direction including the up-down direction.

As described above, in a case where the vibration device 20 includes a plurality of vibration mechanisms 21, the vibration mechanisms 21 may be operated in accordance with the same control command. However, as described earlier with reference to the example of generating a turning force, an alternative is to input control commands to the individual vibration mechanisms 21 so as to operate them according to different vibration waveforms. Further, when the pseudo force sensory vibration data and the tactile sensory vibration data are to be separately transmitted to the vibration device 20, they may be inputted to separate vibration mechanisms 21. In such a case, it is possible to let some of the vibration mechanisms 21 generate a tactile sensory vibration and let the other vibration mechanisms 21 generate a pseudo force sensory vibration. In this instance, the plurality of vibration mechanisms 21 may be of different types. When the above alternative scheme is adopted, a vibration mechanism suitable for a pseudo force sensory vibration having a great output at a predetermined frequency and a vibration mechanism suitable for a tactile sensory vibration having a wide applicable frequency band may be selectively used to effectively present the respective vibrations to the user.

Figure 17:
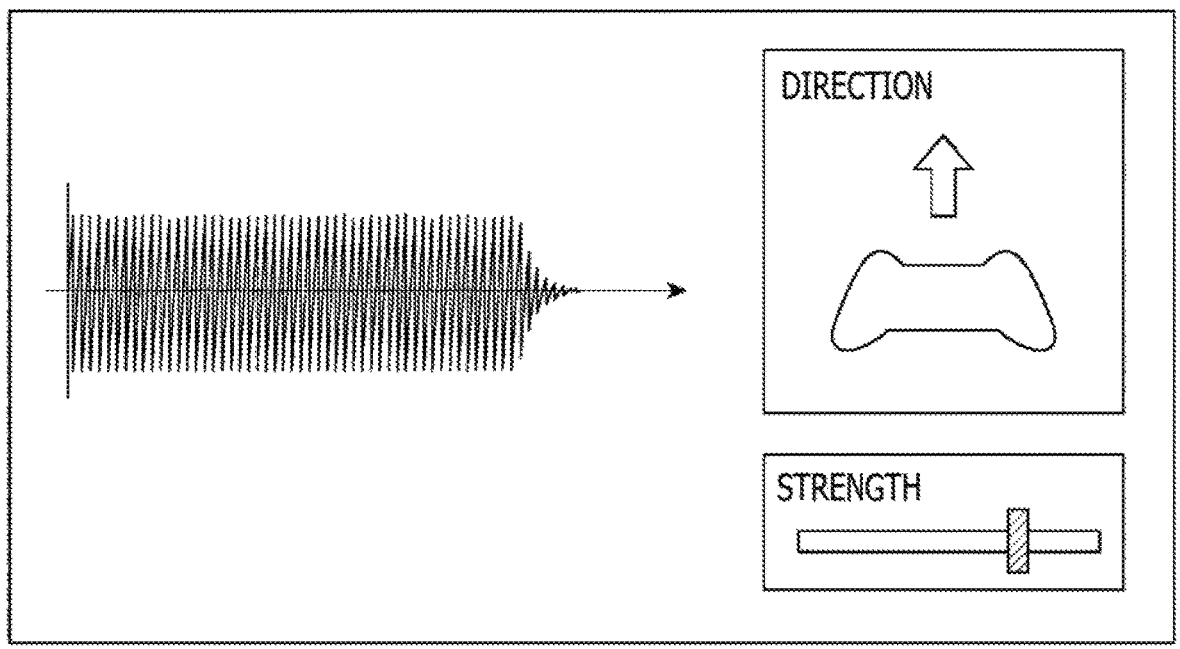
FIG. 17 is a diagram illustrating an exemplary display presented by a creation program.

Concrete examples of a creation program used by a creator of the application program to specify the vibration for generating a pseudo force sensation will now be described. FIG. 17 illustrates an exemplary screen that appears on a display in accordance with the creation program. The creator uses the screen to specify the direction in which the pseudo force sensation is to be generated and its strength. In the example of FIG. 17, the shape of the vibration device 20 is displayed on the screen so that the direction in which the pseudo force sensation is to be generated can be instructed by using an arrow.

Figure 18:
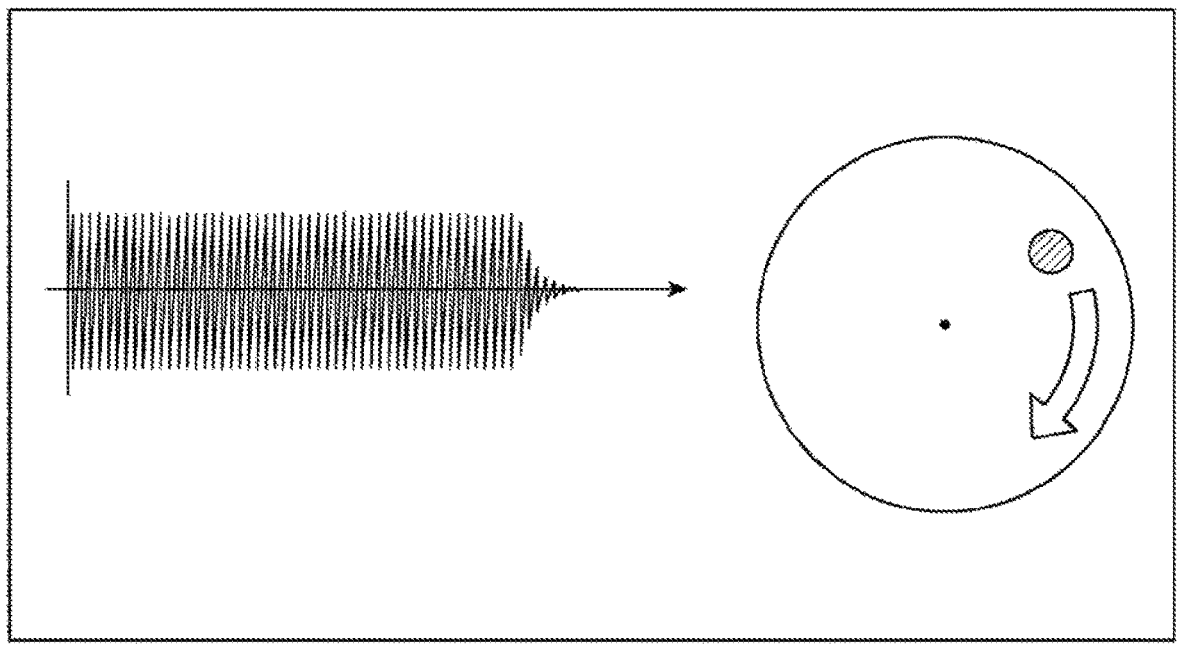
FIG. 18 is a diagram illustrating another exemplary display presented by the creation program.

FIG. 18 illustrating another exemplary display screen of the creation program. In the example of FIG. 18, the strength and direction of the pseudo force sensation can be specified by using a circular region. More specifically, the creator specifies the direction and strength of the pseudo force sensation by operating a manipulator to designate the direction and distance from the center of the circular region. Further, in a case where the turning force can be presented by using the vibration device 20, the generation of a waveform for presenting a rotation may be instructed by inputting the trajectory of rotation as indicated by a block arrow.

The vibration control system 1 according to the present embodiment, which has been described above, is able to effectively present both the tactile sensation and the pseudo force sensation to the user by allowing the vibration mechanism 21 in the vibration device 20 to generate a vibration.

The embodiment of the present invention is not limited to the above-described one. For example, the foregoing description assumes that the vibration device 20 is an operating device for receiving a user's operation input. However, the vibration device 20 is not limited to such an operating device. The vibration device 20 may be a device that is merely used to present the tactile sensation and the pseudo force sensation to the user or used for other purposes.

Further, the foregoing description assumes that the vibration control apparatus 10, which is separate from the vibration device 20, performs the adjustment process of adjusting the pseudo force sensory vibration and the tactile sensory vibration. However, the present invention is not limited to such a configuration. An alternative is to allow the vibration device 20 to perform the vibration adjustment process. When such an alternative is adopted, the vibration device 20 acquires the pseudo force sensory vibration data and tactile sensory vibration data outputted, for example, from the application program, then performs the adjustment process based on the acquired vibration data, and causes the vibration mechanism 21 to generate a vibration based on the result of adjustment. In this case, the vibration device 20 functions as the vibration control apparatus according to the embodiment of the present invention.

REFERENCE SIGNS LIST

1 Vibration control system, 10 Vibration control apparatus, 11 Control section, 12 Storage section, 13 Communication section, 14 Display apparatus, 20 Vibration device, 21 Vibration mechanism, 31 Application execution section, 32 Vibration data acquisition section, 33 Vibration adjustment section, 34 Vibration control section, 35 Setting information reception section.

The invention claimed is:

1. A vibration control apparatus for vibrating a vibration mechanism, the vibration control apparatus comprising:
   a pseudo force sensory vibration data acquisition section that acquires pseudo force sensory vibration data descriptive of a pseudo force sensory vibration presenting a pseudo force sensation causing a user to feel a force of pulling in a specific direction;
   a tactile sensory vibration data acquisition section that acquires tactile sensory vibration data descriptive of a tactile sensory vibration causing the user to feel a tactile sensation different from the pseudo force sensation;
   a vibration control section that causes the vibration mechanism to generate a vibration based on the pseudo force sensory vibration data and the tactile sensory vibration data; and
   a vibration adjustment section that adjusts at least one of the pseudo force sensory vibration and the tactile sensory vibration in accordance with one or more waveform parameters of the other of the at least one of the pseudo force sensory vibration and the tactile sensory vibration, such that the pseudo force sensory vibration and the tactile sensory vibration are simultaneously generated, wherein the vibration control section causes the vibration mechanism to generate the vibration based on a result of adjustment, wherein at least one of:
   (i) the vibration adjustment section changes a frequency of the pseudo force sensory vibration in accordance with the tactile sensory vibration, and inverts a waveform of the pseudo force sensory vibration in a case where the frequency of the pseudo force sensory vibration is changed within a predetermined numerical value range, and
   (ii) the vibration adjustment section adjusts a waveform of the tactile sensory vibration so as to reduce a bias of a vibration along a direction in which the pseudo force sensation is presented.

2. The vibration control apparatus according to claim 1, wherein the vibration adjustment section varies an amplitude of a waveform of the pseudo force sensory vibration in accordance with a magnitude of an amplitude of a waveform of the tactile sensory vibration.

3. The vibration control apparatus according to claim 1, wherein the vibration adjustment section varies a length of the pseudo force sensory vibration so as to terminate the pseudo force sensory vibration at a time point later than a termination of the tactile sensory vibration.

4. The vibration control apparatus according to claim 1, wherein the vibration adjustment section determines a shape of a waveform of the pseudo force sensory vibration in accordance with the tactile sensory vibration.

5. The vibration control apparatus according to claim 1, further comprising:
a setting information reception section that receives, from the user, inputted setting information regarding strengths of the pseudo force sensory vibration and the tactile sensory vibration,
wherein the vibration adjustment section makes the adjustment in accordance with the inputted setting information.

6. The vibration control apparatus according to claim 1, wherein the vibration adjustment section adds, to a beginning of the pseudo force sensory vibration, a vibration for presenting the pseudo force sensation oriented opposite to a direction in which the pseudo force sensation is presented.

7. A vibration device comprising:
a vibration mechanism;
a vibration data acquisition section that acquires vibration data including a description of a pseudo force sensory vibration presenting a pseudo force sensation causing a user to feel a force of pulling in a specific direction and a description of a tactile sensory vibration causing the user to feel a tactile sensation different from the pseudo force sensation;
a vibration control section that causes the vibration mechanism to generate a vibration based on the acquired vibration data; and
a vibration adjustment section that adjusts at least one of the pseudo force sensory vibration and the tactile sensory vibration in accordance with one or more waveform parameters of the other of the at least one of the pseudo force sensory vibration and the tactile sensory vibration, such that the pseudo force sensory vibration and the tactile sensory vibration are simultaneously generated, wherein the vibration control section causes the vibration mechanism to generate the vibration based on a result of adjustment, wherein at least one of:
(i) the vibration adjustment section changes a frequency of the pseudo force sensory vibration in accordance with the tactile sensory vibration, and inverts a waveform of the pseudo force sensory vibration in a case where the frequency of the pseudo force sensory vibration is changed within a predetermined numerical value range, and
(ii) the vibration adjustment section adjusts a waveform of the tactile sensory vibration so as to reduce a bias of a vibration along a direction in which the pseudo force sensation is presented.

8. A method of controlling a vibration mechanism, the method comprising:
acquiring pseudo force sensory vibration data descriptive of a pseudo force sensory vibration presenting a pseudo force sensation causing a user to feel a force of pulling in a specific direction;
acquiring tactile sensory vibration data descriptive of a tactile sensory vibration causing the user to feel a tactile sensation different from the pseudo force sensation;
causing the vibration mechanism to generate a vibration based on the pseudo force sensory vibration data and the tactile sensory vibration data; and
adjusting at least one of the pseudo force sensory vibration and the tactile sensory vibration in accordance with one or more waveform parameters of the other of the at least one of the pseudo force sensory vibration and the tactile sensory vibration, such that the pseudo force sensory vibration and the tactile sensory vibration are simultaneously generated, wherein the causing includes causing the vibration mechanism to generate the vibration based on a result of adjustment, wherein at least one of:
(i) the adjusting includes changing a frequency of the pseudo force sensory vibration in accordance with the tactile sensory vibration, and inverting a waveform of the pseudo force sensory vibration in a case where the frequency of the pseudo force sensory vibration is changed within a predetermined numerical value range, and
(ii) the adjusting includes adjusting a waveform of the tactile sensory vibration so as to reduce a bias of a vibration along a direction in which the pseudo force sensation is presented.

9. A non-transitory, computer readable storage medium containing a program, which when executed by a computer, causes the computer to control a vibration mechanism, by carrying out actions, comprising:
acquiring pseudo force sensory vibration data descriptive of a pseudo force sensory vibration presenting a pseudo force sensation causing a user to feel a force of pulling in a specific direction;
acquiring tactile sensory vibration data descriptive of a tactile sensory vibration causing the user to feel a tactile sensation different from the pseudo force sensation;
causing the vibration mechanism to generate a vibration based on the pseudo force sensory vibration data and the tactile sensory vibration data; and
adjusting at least one of the pseudo force sensory vibration and the tactile sensory vibration in accordance with one or more waveform parameters of the other of the at least one of the pseudo force sensory vibration and the tactile sensory vibration, such that the pseudo force sensory vibration and the tactile sensory vibration are simultaneously generated, wherein the causing includes causing the vibration mechanism to generate the vibration based on a result of adjustment, wherein at least one of:
(i) the adjusting includes changing a frequency of the pseudo force sensory vibration in accordance with the tactile sensory vibration, and inverting a waveform of the pseudo force sensory vibration in a case where the frequency of the pseudo force sensory vibration is changed within a predetermined numerical value range, and
(ii) the adjusting includes adjusting a waveform of the tactile sensory vibration so as to reduce a bias of a vibration along a direction in which the pseudo force sensation is presented.

10. A vibration control apparatus for vibrating a vibration mechanism, the vibration control apparatus comprising:
a pseudo force sensory vibration data acquisition section that acquires pseudo force sensory vibration data descriptive of a pseudo force sensory vibration presenting a pseudo force sensation causing a user to feel a force of pulling in a specific direction;
a tactile sensory vibration data acquisition section that acquires tactile sensory vibration data descriptive of a tactile sensory vibration causing the user to feel a tactile sensation different from the pseudo force sensation;

a vibration control section that causes the vibration mechanism to generate a vibration based on the pseudo force sensory vibration data and the tactile sensory vibration data;

a vibration adjustment section that adjusts at least one of the pseudo force sensory vibration and the tactile sensory vibration in accordance with one or more waveform parameters of the other of the at least one of the pseudo force sensory vibration and the tactile sensory vibration, such that the pseudo force sensory vibration and the tactile sensory vibration are simultaneously generated, wherein the vibration control section causes the vibration mechanism to generate the vibration based on a result of adjustment;

a setting information reception section that receives, from the user, inputted setting information regarding strengths of the pseudo force sensory vibration and the tactile sensory vibration, wherein the vibration adjustment section makes the adjustment in accordance with the inputted setting information.

* * * * *